May 29, 1956
F. LEIGHTON
2,747,897
SERRATED SEMI-V-BAND COUPLING
Filed May 16, 1955
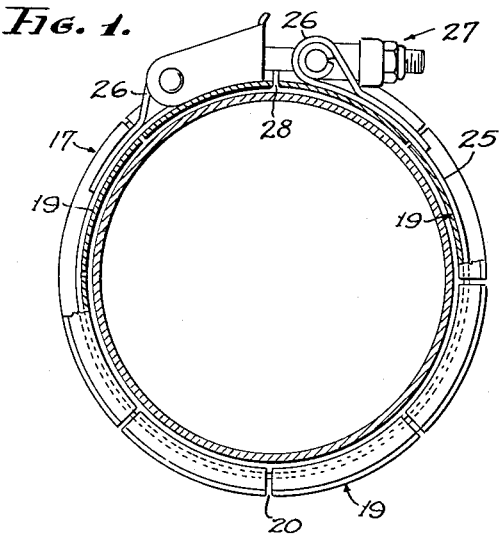
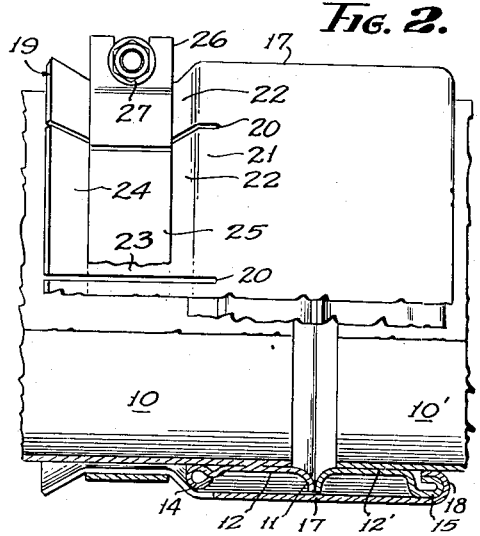
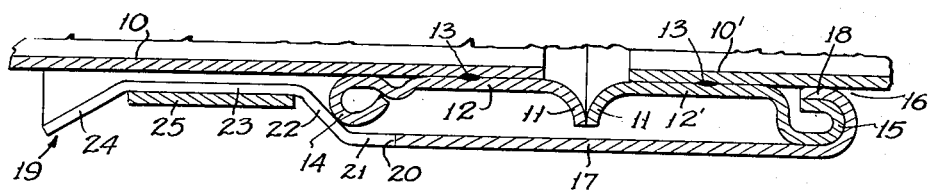
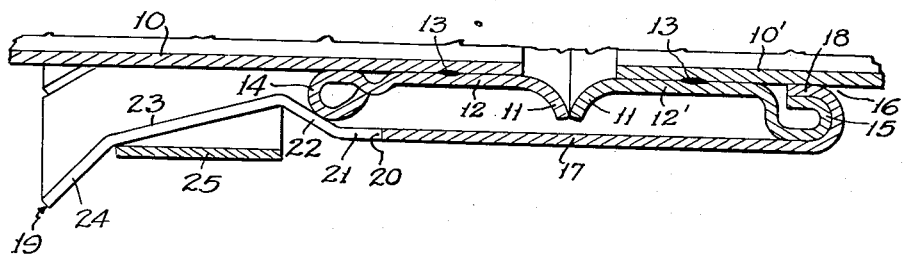
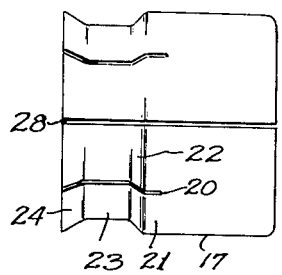
FRANCIS LEIGHTON
INVENTOR.
BY *Lynn W Latta*
-ATTORNEY- United States Patent Office 2,747,897
Patented May 29, 1956

2,747,897
SERRATED SEMI-V-BAND COUPLING

Francis Leighton, Altadena, Calif., assignor to Marman Products Company, Inc., Los Angeles, Calif., a corporation of California Application May 16, 1955, Serial No. 508,345

7 Claims. (Cl. 285—129)

This invention relates to fluid line couplings. The general object is to provide an improved "live joint" coupling adapted to maintain an effective fluid sealing connection between aligned tube sections of a fluid line while accommodating angularly misaligning and axially expanding and contracting displacements of the tube sections, one with respect to the other, whereby the coupling may respond to various stresses and strains to which the tubing line may be subjected in service, whether induced by temperature changes, dimensional tolerance or positional difficulties encountered in the attachment of the sections of the fluid line to fixed supports during installation, or vibrational and other loads imposed on the fluid line in the operation of a particular apparatus (e. g. an airplane) in which the fluid line may be utilized.

A further object is to provide a coupling which, for some installations may utilize an interposed gasket for fluid sealing, yet for other installations is capable of providing an all metal fluid retaining sealing connection between the tube sections, without the use of a gasket, while maintaining the adaptability to load changes referred to above.

A further object is to provide such a coupling which can be readily uncoupled and recoupled without impairing its fluid sealing efficiency after recoupling.

Another object is to provide a coupling which, while having the above mentioned characteristics, is nevertheless of relatively simple and inexpensive construction and quite durable.

Other objects will become apparent in the ensuing specifications and appended drawing in which:

Fig. 1 is an end view, partially broken away and in section, of a coupling embodying the invention;

Fig. 2 is a side view of the same, partially broken away and shown in section;

Fig. 3 is an enlarged fragmentary detail sectional view of the coupling in closed condition;

Fig. 4 is an enlarged fragmentary detail sectional view of the same portion of the coupling, in partially open condition; and Fig. 5 is a plan view of the coupler sleeve.

Referring now to the drawings in detail, I have shown therein, as an example of one form in which the invention may be embodied, a tube coupling embodying tube sections 10 and 10' which may in some cases consist in short lengths of tubing adapted to be attached, as by welding, to longer sections of tube components of the fluid line in which the coupling is to constitute a link, although sections 10, 10' may on the other hand constitute the full-length sections of the fluid line.

The respective tube sections 10, 10' are provided with respective mating flanges 11, 11, of bell form, the ends of which, in the assembled coupling, are brought together under end pressure loading, to provide a fluid seal. The flanges 11, 11 are of sufficient resiliency to be deflected, during the operation of closing the coupling, from their cross-sectional shape illustrated in Fig. 4, wherein they have a more acute angle of flare with respect to the coupling axis, to a more flattened condition, illustrated in Fig. 3. It will be understood, of course, that the invention does not require that the flanges in their unstressed and loaded states, respectively, have the exact flare angles illustrated, or that the degree of deflection be exactly as illustrated, the drawings being intended merely to illustrate with possibly some exaggeration for visual emphasis, that the flanges do undergo substantial deflection during loading. Such deflection serves a number of advantageous functions, including:

(a) With a reasonably smooth finish on the mating faces of the flanges, and with fairly true normal circumferential contours of the mating surfaces, i. e., the respective circular lines of contact being disposed in fairly true, flat planes in the unstressed normal state of the flanges, any slight deviation from perfectly true contour will be eliminated, in the loading of the flanges, by a yielding action as they are pressed into mating contact, until they are fully engaged, with fluid sealing contact, throughout the circumferential extent of seating.

(b) As will be more fully explained hereinafter, the flanges, in their deflected state, will remain in fluid sealing contact while accommodating angularly misaligning and axially expanding and contracting displacements of the tube sections, one with respect to the other, thus providing a "live" joint characteristic in which the coupling will respond to various stresses, and strains to which the tubing line may be subjected in service, whether induced by temperature changes, dimensional tolerance or positional difficulties encountered in the attachment of the sections of the fluid line to fixed supports during installation, or vibrational and other loads imposed on the fluid line in the operation of a particular apparatus (e. g. an airplane) in which the fluid line may be utilized.

(c) Being an all-metal coupling it is especially suitable for high temperature installations.

(d) The coupling may be repeatedly uncoupled and recoupled with readiness and ease, without impairing its fluid sealing efficiency after re-coupling.

The flanges 11, 11 are formed as integral end portions of coupler collars 12, 12', the latter being attached and fluid-sealed to tube sections 10, 10' by suitable means, such as circular lines of seam-welding 13. At their ends remote from flanges 11, collars 12, 12' are formed with integral coupling elements consisting in a fulcrum bead 14 on collar 12 and a latching bead 15 on collar 12'. Bead 14 lies flatly against tube section 10 for reinforcement thereof against the radial loads imposed thereon as hereinafter specified. Latching bead 15 is spaced radially outwardly from tube section 10' to provide an annular keeper space 16.

Collar units 12, 12' are bridged by a coupler sleeve 17, one end of which is formed with an annular latching flange 18 which is hooked inwardly to fit around bead 15 and to be received in annular keeper space 16. At its opposite end, coupler sleeve 17 has a series of latching fingers, indicated generally at 19, formed as integral extensions of the cylindrical body of sleeve 17, and circumferentially separated by a series of axially extending slits 20 (Figs. 1 and 2). Each finger 19 includes a base portion 21 disposed as a linear extension of a corresponding segmental area of sleeve 17; an inwardly inclined camming section 22 formed as a segment of a cone and positioned to engage fulcrum bead 14; a lever portion 23, formed as a segment of a cylinder and adapted to be engaged by a band clamp; and an outwardly bent retainer tip 24 for retaining a band clamp 25 against displacement on the fingers.

Band clamp 25 may be of a well known type having respective end loops 26 releasably coupled by a connector unit, indicated at 27.

Coupler sleeve 17 is a split sleeve (Fig. 5) circumferentially continuous except where respective ends thereof are separated by a gap 28. Its resiliency is sufficient to enable the operator to spread it to a point where it may be telescoped over the respective beads 14 and 15 of coupler collars 12, 12' during assembly and disassembly of the coupling. Thus, by opening band clamp 25 and spreading the sleeve 17, it becomes possible to insert the respective tube sections 10, 10' with their respective coupler collar units 12, 12' through the respective ends of coupler sleeve 17 until the flanges 11 come together, as more fully explained hereinafter.

In the operation of assembling the coupling, the clamp is opened, the sleeve 17 is spread as previously stated, and the respective tube sections are inserted, the tube section 10' being inserted first through the opening defined within latching flange 18 and shifted leftwardly, as viewed in Fig. 4, until the end extremity of coupler collar bead 15 has cleared the inner extremity of flange 18. That end of the sleeve 17 may then be allowed to contract to its normal diameter wherein latching flange 18 can be inserted into annular keeper space 16, whereupon the tube section 10' is retracted to move bead 15 into the toroidal channel defined within flange 18, seating therein as indicated in Figs. 4 and 5. Tube section 10 is then inserted into the other end of sleeve 17, the flange 11 thereof engaging the flaring tip portions 24 of fingers 19 with a camming action which wedges the fingers 19 apart until the flange 11, and then the bead 14, can pass between the lever portions 23 of the fingers 19 and enter the enlarged space within the body of sleeve 17.

Spreading of fingers 19 is facilitated by added resiliency, inwardly of shoulders 22, provided in base portions 21 thereof. The fingers 19 are then closed around bead 14 until the latter is engaged by camming shoulders 22, approximately as indicated in Fig. 4. Band clamp 25 is then closed around lever sections 23 and drawn tight, moving shoulders 22 radially inwardly with a wedging action against bead 14 which displaces coupler collar 12 toward collar 12' while the latter is held unyielding by the abutting engagement of bead 15 in flange 18. As a result, the collars 12, 12' are drawn together, flexing the flanges 11 to the more flattened condition hereinbefore referred to, and thereby establishing a fluid seal.

Flexibility to accommodate angular misalignment is provided by the spring action of flanges 11, which can increase their deflection at one side of the coupling while decreasing their deflection at a diametrically opposite point, without any substantial change in the distribution of end loading around the circumference of the joint. This result is best attained by incorporating Belleville washer characteristics in flanges 11, 11, so that their end loading remains substantially constant throughout a normal range of deflection variations arising from operating conditions such as those hereinbefore mentioned. Linear dimensional changes in the fluid line (e. g. expansion or contraction arising from temperature variations) are accommodated by changes in deflection evenly distributed circumferentially, with a retention of sealing efficiency equally as good as in the case of angular shifts.

I claim:

1. In a flexible tube coupling: a pair of coupling collars adapted to be attached to respective tube sections to be coupled, said collars having respective end flanges for end-abutting, sealing contact with one another and having respective remote end parts displaced radially outwardly from the body diameter of said collars; a coupling sleeve having a diameter such as to encompass said remote end parts, having at one end a reentrant latching part adapted for end-engagement with one of said end parts, and having adjacent its other end a series of circumferentially separated resilient latching fingers including respective camming shoulder portions converging toward said other end and engageable against the other of said end parts with a camming action for drawing said collars together to establish flattening deflection of said flanges against one another in response to radially inward movement of said fingers; and a band clamp encircling said fingers endwardly thereof from said shoulders and operable, by constriction, to effect said radially inward movement of the fingers.

2. A flexible coupling as defined in claim 1, wherein said end parts comprise toroidal beads, one of which is a fulcrum bead for camming engagement by said camming shoulders and is adapted to bear against the wall of the adjacent tube section, and the other of which is a latch keeper bead, spaced radially from the wall of the adjacent tube section to define a keeper space into which said reentrant latching part is receivable.

3. A coupling as defined in claim 2, wherein said reentrant latching part is in the form of a flange of hooked cross section, substantially coextensive circumferentially with the body of said sleeve.

4. A coupling as defined in claim 1, wherein said coupler sleeve is split from end to end along one side thereof, whereby it may be spread to increase the diameter of said reentrant latching part whereby to accommodate telescoping thereof over the flange and opposite end part of the corresponding coupler collar.

5. A coupling as defined in claim 1, wherein each finger includes a lever portion, extending axially endward from the respective camming shoulder thereof, said band clamp embracing the series of said lever portions.

6. A coupling as defined in claim 1, wherein said fingers include flaring tip portions of conic section form, facilitating the entry of the respective coupler collar into the sleeve between said fingers.

7. A coupling as defined in claim 1, wherein each finger includes a lever portion, extending axially endward from the respective camming shoulder thereof, said band clamp embracing the series of said lever portions; said lever portions terminating in outwardly flaring tip portions of conic section form, facilitating the entry of the respective coupler collar into the sleeve between said fingers.

References Cited in the file of this patent

UNITED STATES PATENTS

| | | |
|---|---|---|
| 966,513 | Avery | Aug. 9, 1910 |
| 1,979,274 | Le Pere | Nov. 6, 1934 |